US012360990B2

(12) United States Patent
Benda et al.

(10) Patent No.: US 12,360,990 B2
(45) Date of Patent: Jul. 15, 2025

(54) TRANSLITERATION OF MACHINE INTERPRETABLE LANGUAGES FOR ENHANCED COMPACTION

(71) Applicant: Bank of America Corporation, Charlotte, NC (US)

(72) Inventors: Carl Benda, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 2 days.

(21) Appl. No.: 17/979,928

(22) Filed: Nov. 3, 2022

(65) Prior Publication Data

US 2024/0152511 A1     May 9, 2024

(51) Int. Cl.
    *G06F 16/2452*     (2019.01)
    *G06F 16/2455*     (2019.01)

(52) U.S. Cl.
    CPC ...... *G06F 16/2452* (2019.01); *G06F 16/2455* (2019.01)

(58) Field of Classification Search
    None
    See application file for complete search history.

(56) References Cited

U.S. PATENT DOCUMENTS

| | | | |
|---|---|---|---|
| 5,432,948 A | 7/1995 | Davis et al. | |
| 5,640,587 A | 6/1997 | Davis et al. | |
| 6,425,123 B1 | 7/2002 | Rojas et al. | |
| 6,460,015 B1 | 10/2002 | Hetherington et al. | |
| 6,890,180 B2 | 5/2005 | Sterns et al. | |
| 7,099,876 B1 | 8/2006 | Hetherington et al. | |
| 7,369,986 B2 | 5/2008 | Janakiraman et al. | |
| 7,805,290 B2 | 9/2010 | Janakiraman et al. | |
| 7,835,903 B2 | 11/2010 | Datta | |

(Continued)

FOREIGN PATENT DOCUMENTS

WO     WO-2012174738 A1 * 12/2012 ........... G06F 16/134

OTHER PUBLICATIONS

Rodriguez-Muro, Mariano, Martin Rezk, Josef Hardi, Mindaugas Slusnys, Timea Bagosi, and Diego Calvanese. "Efficient SPARQL-to-SQL translation using R2RML Mapping." KRDB Research Centre, Free University of Bozen-Bolzano (2013). (Year: 2013).*

*Primary Examiner* — Uyen T Le
(74) *Attorney, Agent, or Firm* — Banner & Witcoff, Ltd.

(57) ABSTRACT

Aspects of the disclosure relate to transliteration of machine interpretable languages. A computing platform may generate a plurality of query keys, configured for use in translating queries from a first format to a second format, which may include, for each input query corresponding to the plurality of query keys: selecting, based on features of the input query, a compaction method, and applying the selected compaction method to the input query to produce a corresponding query key. The computing platform may store the plurality of query keys in a lookup table. The computing platform may receive a first query, corresponding to the input queries, formatted in the first format. The computing platform may translate, by identifying a query key corresponding to the first query in the lookup table, the first query to produce a second query, formatted in the second format. The computing platform may execute the second query.

20 Claims, 10 Drawing Sheets

(56) References Cited

U.S. PATENT DOCUMENTS

| | | |
|---|---|---|
| 7,853,444 B2 | 12/2010 | Wang et al. |
| 7,885,807 B2 | 2/2011 | Bagnato et al. |
| 8,005,664 B2 | 8/2011 | Hanumanthappa |
| 8,275,600 B2 | 9/2012 | Bilac et al. |
| 8,275,601 B2 | 9/2012 | Wang et al. |
| 8,326,600 B2 | 12/2012 | Elfeky et al. |
| 8,438,008 B2 | 5/2013 | Awaida et al. |
| 8,463,597 B2 | 6/2013 | Elizarov et al. |
| 8,510,095 B2 | 8/2013 | Wang et al. |
| 8,515,730 B2 | 8/2013 | Fux et al. |
| 8,521,761 B2 | 8/2013 | Katragadda et al. |
| 8,554,537 B2 | 10/2013 | Rai et al. |
| 8,560,298 B2 | 10/2013 | Kumaran et al. |
| 8,655,642 B2 | 2/2014 | Fux et al. |
| 8,655,643 B2 | 2/2014 | Haddad et al. |
| 8,682,643 B1 | 3/2014 | Hafez |
| 8,725,491 B2 | 5/2014 | Elizarov et al. |
| 8,731,901 B2 | 5/2014 | Srihari et al. |
| 8,762,129 B2 | 6/2014 | Huang et al. |
| 8,775,165 B1 | 7/2014 | Oikawa |
| 8,812,300 B2* | 8/2014 | Gillam .............. G06F 16/90344 704/4 |
| 8,972,238 B2 | 3/2015 | Wang et al. |
| 9,009,021 B2 | 4/2015 | Ushakov et al. |
| 9,176,936 B2 | 11/2015 | Jan et al. |
| 9,189,557 B2 | 11/2015 | Singh et al. |
| 9,323,744 B2 | 4/2016 | Hagiwara |
| 9,489,351 B2 | 11/2016 | Scriffignano et al. |
| 9,665,275 B2 | 5/2017 | Huang et al. |
| 9,858,268 B2 | 1/2018 | Huang et al. |
| 9,858,269 B2 | 1/2018 | Huang et al. |
| 9,928,828 B2 | 3/2018 | Fume et al. |
| 10,089,975 B2 | 10/2018 | Fume et al. |
| 10,185,710 B2 | 1/2019 | Egi |
| 10,373,606 B2 | 8/2019 | Ashikawa et al. |
| 10,394,960 B2 | 8/2019 | Pino et al. |
| 10,394,964 B2 | 8/2019 | Deshmukh et al. |
| 10,402,489 B2 | 9/2019 | Pino et al. |
| 10,643,028 B1 | 5/2020 | Pino et al. |
| 10,686,750 B2 | 6/2020 | Daryani et al. |
| 10,810,380 B2 | 10/2020 | Pino et al. |
| 11,032,676 B2 | 6/2021 | Mottes et al. |
| 11,100,098 B2* | 8/2021 | Bolsius ................. G06F 16/245 |
| 11,120,064 B2 | 9/2021 | Ash |
| 11,507,274 B2* | 11/2022 | Butcher ................ G06F 3/0661 |
| 2007/0288448 A1* | 12/2007 | Datta ................... G06F 16/3338 707/999.005 |
| 2007/0288449 A1* | 12/2007 | Datta ................... G06F 16/3338 707/999.005 |
| 2013/0246042 A1* | 9/2013 | Hagiwara ............... G06F 40/42 704/2 |
| 2014/0195514 A1* | 7/2014 | Stein ..................... G06F 16/256 707/722 |
| 2014/0214779 A1* | 7/2014 | Francis ............... G06F 16/1744 707/693 |
| 2021/0042308 A1* | 2/2021 | Mustafi ................... G06F 7/14 |
| 2023/0133690 A1* | 5/2023 | Gao ..................... G06V 30/416 704/9 |

\* cited by examiner

415

| SQL STATEMENT | KEY | DICTIONARY OF PARAMETERS |
|---|---|---|
| select * FROM students WHERE class_id = XYZ; | SELECT*FROM$0WHERE$1=$2 | {'$0': 'students', '$1': 'class_id', '$2': 'xyz'} |
| select * from teachers WHERE class_id = ABC; | SELECT*FROM$0WHERE$1=$2 | {'$0': 'teachers', '$1': 'class_id', '$2': 'ABC'} |
| select * FROM students WHERE major = MAJOR; | SELECT*FROM$0WHERE$1=$2 | {'$0': 'students', '$1': 'major', '$2':'MAJOR'} |
| SELECT * from TAs WHERE class_id = DEF; | SELECT*FROM$0WHERE$1=$2 | {'$0' : 'TAs', '$1' : 'class_id,' '$2' : 'DEF'} |

| KEY | FORMATTED STATEMENT |
|---|---|
| SELECT*FROM$0WHERE$1=$2 | SELECT * FROM $0 WHERE $1 = $2 |

| KEY | DICTIONARY OF PARAMETERS | RECONSTRUCTED SQL STATEMENT |
|---|---|---|
| SELECT*FROM$0WHERE$1=$2 | {'$0' : 'students', '$1' : 'class_id', '$2' : 'XYZ'} | SELECT * FROM students WHERE class_id = XYZ; |
| SELECT*FROM$0WHERE$1=$2 | {'$0' : 'teachers', '$1' : 'class_id', '$2' : 'ABC'} | SELECT * FROM teachers WHERE class_id = ABC; |
| SELECT*FROM$0WHERE$1=$2 | {'$0' : 'students', '$1' : 'major', '$2' : 'MAJOR'} | SELECT * FROM students WHERE major = MAJOR; |
| SELECT*FROM$0WHERE$1=$2 | {'$0' : 'TAs', '$1' : 'class_id', '$2' : 'DEF'} | SELECT * FROM TAs WHERE class_id = DEF; |

FIG. 4E

| Examples | | Flavor 1 – Vanilla | Flavor 2 – "French Vanilla", "Dark Chocolate" | Flavor 3 – Vanilla, Chocolate, French Vanilla" | Flavor 4 – Vanilla, Chocolate AS Swiss, "French Vanilla" |
|---|---|---|---|---|---|
| Select A FROM B WHERE C=D | Key | SELECT$0FROM$1WHERE$2=$3 | SELECT$0FROM$1WHERE$2=$3 | SELECT$0FROM$1WHERE$2=$3 | SELECT$0FROM$1WHERE$2=$3 |
| | Parameters | {$0:A,$1:B,$2:C,$3:D} | {$0:A,$1:B,$2:C,$3:D} | {$0:A,$1:B,$2:C,$3:D} | {$0:A,$1:B,$2:C,$3:D} |
| SELECT "A", "X", "Y" FROM B WHERE C=D | Key | SELECT$0,$1,$2FROM$3,WHERE$4=$5 | SELECT$0FROM$1WHERE$2=$3 | SELECT$0FROM$1WHERE$2=$3 | SELECT$0FROM$1WHERE$2=$3 |
| | Parameters | {$0: "A", $1: "X", $2: "Y", $3:B, $4:C, $5:D} | {$0: "A", "X", "Y", $1:B, $2:C, $3:D} | {$0: "A", "X", "Y", $1:B, $2:C, $3:D} | {$0: "A", "X", "Y", $1:B, $2:C, $3:D} |
| SELECT A,X,Y FROM B WHERE C=D | Key | SELECT$0,$1,$2FROM$3,WHERE$4=$5 | SELECT$0,$1,$2FROM$3,WHERE$4=$5 | SELECT$0FROM$1WHERE$2=$3 | SELECT$0FROM$1WHERE$2=$3 |
| | Parameters | {$0:A,$1:X,$2:Y,$3:B,$4:C,$5:D} | {$0:A, $1: X,$2:Y,$3:B,$4:C, $5:D} | {$0:A,X,Y,$1:B, $2:C, $3:D} | {$0:A,X,Y,$1:B, $2:C, $3:D} |
| SELECT A as a, X AS x, "Y" FROM B WHERE C=D | Key | SELECT$0AS$1,$2AS$3$4FROM$5,WHERE$6=$7 | SELECT$0AS$1,$2AS$3$4FROM$5,WHERE$6=$7 | SELECT$0AS$1,$2AS$3$4FROM$5,WHERE$6=$7 | SELECT$0FROM$1WHERE$2=$3 |
| | Parameters | {$0:A,$1:a,$2:X,$3:x, $4: "Y", $5:B, $6:C,$7:D} | {$0:A,$1:a,$2:X,$3:x, $4: "Y", $5:B, $6:C,$7:D} | {$0:A,$1:a,$2:X,$3:x, $4: "Y", $5:B, $6:C,$7:D} | {$0:A as a, X as x, "Y", $1:B, $2:C,$3:D} |

FIG. 4F

TRANSLITERATION OF MACHINE INTERPRETABLE LANGUAGES FOR ENHANCED COMPACTION

BACKGROUND

Aspects of the disclosure relate to computer hardware and software for processing machine interpretable languages and translating queries. A variety of different machine interpretable languages may be used to generate queries for execution against data warehouses/sources. In some instances, however, such a machine interpretable language may be incompatible with, or otherwise might not be in a preferred format for, query processing. While these incompatible queries can sometimes be converted manually between different languages, the process for doing so is typically time consuming, expensive, inaccurate, and/or otherwise detrimental to user experience. For example, machine interpretable language processing (MILP) may have innate limitations that make it different from natural language processing (NLP). For instance, MILP (unlike NLP) might not tolerate any error. Accordingly, although a human may still understand the meaning of a translation despite significant errors, if a translated query contains any errors such as missing punctuation, capitalization, or incorrect wording, a machine may fail to execute the query. Furthermore, most MILP jobs need to be processed in real time, which might not allow time for conversational improvements (as is offered in NLP). Accordingly, it remains difficult to perform translation of machine interpretable language queries in an effective, efficient, timely, and accurate manner.

SUMMARY

Aspects of the disclosure provide effective, efficient, scalable, and convenient technical solutions that address and overcome the technical problems associated with machine interpretable language translation. In accordance with one or more embodiments of the disclosure, a computing platform comprising at least one processor, a communication interface, and memory storing computer-readable instructions may generate a plurality of query keys, configured for use in translating queries from a first format to a second format, which may include, for each input query corresponding to the plurality of query keys: 1) selecting, based on features of the input query, a compaction method of a plurality of compaction methods, where use of each available compaction method produces a common query key for a different number of input queries, and 2) applying, after selecting the compaction method, the compaction method to the input query to produce a corresponding query key. The computing platform may store the plurality of query keys in a lookup table. The computing platform may receive a first query, corresponding to the input queries, formatted in the first format. The computing platform may translate, by identifying a query key of the plurality of query keys corresponding to the first query in the lookup table, the first query to produce a second query, where the second query is formatted in the second format. The computing platform may execute the second query.

In one or more instances, the compaction method may include compacting the first query only by: removing non-essential parameters from the first query, and replacing each essential parameter with a variable. In one or more instances, the compaction method may produce a different query key for input queries that include one or more of: a string literal, parameters separated by a comma, and an as statement.

In one or more examples, the compaction method may include compacting the first query only by: removing non-essential parameters from the first query, and replacing each essential parameter with a variable, where replacing each essential parameter with a variable may include replacing a string literal punctuated by a comma, including multiple parameters, with a single variable. In one or more examples, the compaction method may produce: the same query key for input queries that include one or more of: individual parameters and string literals punctuated by commas, and different query keys for input queries that include one or more of: other parameters separated by commas, and an as statement.

In one or more instances, the compaction method may include compacting the first query only by: removing non-essential parameters from the first query, and replacing each essential parameter with a variable, which may include replacing any group of parameters separated by a comma, including string literals, with a single variable. In one or more instances, the compaction method may produce: 1) the same query key for input queries that include one or more of: individual parameters, string literals punctuated by commas, and other parameters separated by commas, and 2) different query keys for input queries that include an as statement.

In one or more examples, the compaction method may include compacting the first query by: removing non-essential parameters from the first query, and replacing each essential parameter with a variable, which may include replacing any group of parameters separated by a comma, including string literals, and any group of parameters separated by an as statement, with a single variable. In one or more examples, the compaction method may produce the same query key for input queries that include one or more of: individual parameters, string literals punctuated by commas, other parameters separated by commas, and an as statement.

In one or more instances, selecting the compaction method may include: 1) identifying whether or not any of the queries include an as statement; 2) based on identifying that at least one query includes an as statement, applying a first compaction method, which may cause the same query key to be produced for queries that include one or more of: individual parameters, string literals punctuated by commas, other parameters separated by commas, and an as statement; 3) based on identifying that the queries do not include the as statement, identifying whether or not any of the queries include parameters separated by commas other than string literals; 4) based on identifying that at least one query does include the parameters separated by commas other than string literals, applying a second compaction method, which may cause the same query key to be produced for queries that include one or more of: individual parameters, string literals punctuated by commas, and other parameters separated by commas; 5) based on identifying that the queries do not include the parameters separated by commas other than string literals, identifying whether or not any of the queries include string literals; 6) based on identifying that at least one query does include the string literals, applying a third compaction method, which may cause the same query key to be produced for queries that include one or more of: individual parameters and string literals; and 7) based on identifying that the queries do not include string literals, applying a fourth compaction method, wherein applying the fourth compaction method comprises replacing each non-essential parameter in the queries with a unique variable.

In one or more examples, the lookup table may include the queries, the query keys corresponding to the queries, and formatted statements corresponding to the query keys, wherein the formatted statements are in the second format. In one or more examples, translating the first query to the second query may include: 1) removing non-essential parameters from the first query; 2) identifying the query key corresponding to the first query; 3) identifying a formatted statement corresponding to the query key; and 4) replacing variable in the formatted statement with the non-essential parameters.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4F depict illustrative diagrams for enhanced compaction in transliteration of machine interpretable languages in accordance with one or more example embodiments.

DETAILED DESCRIPTION

Figure 1A:
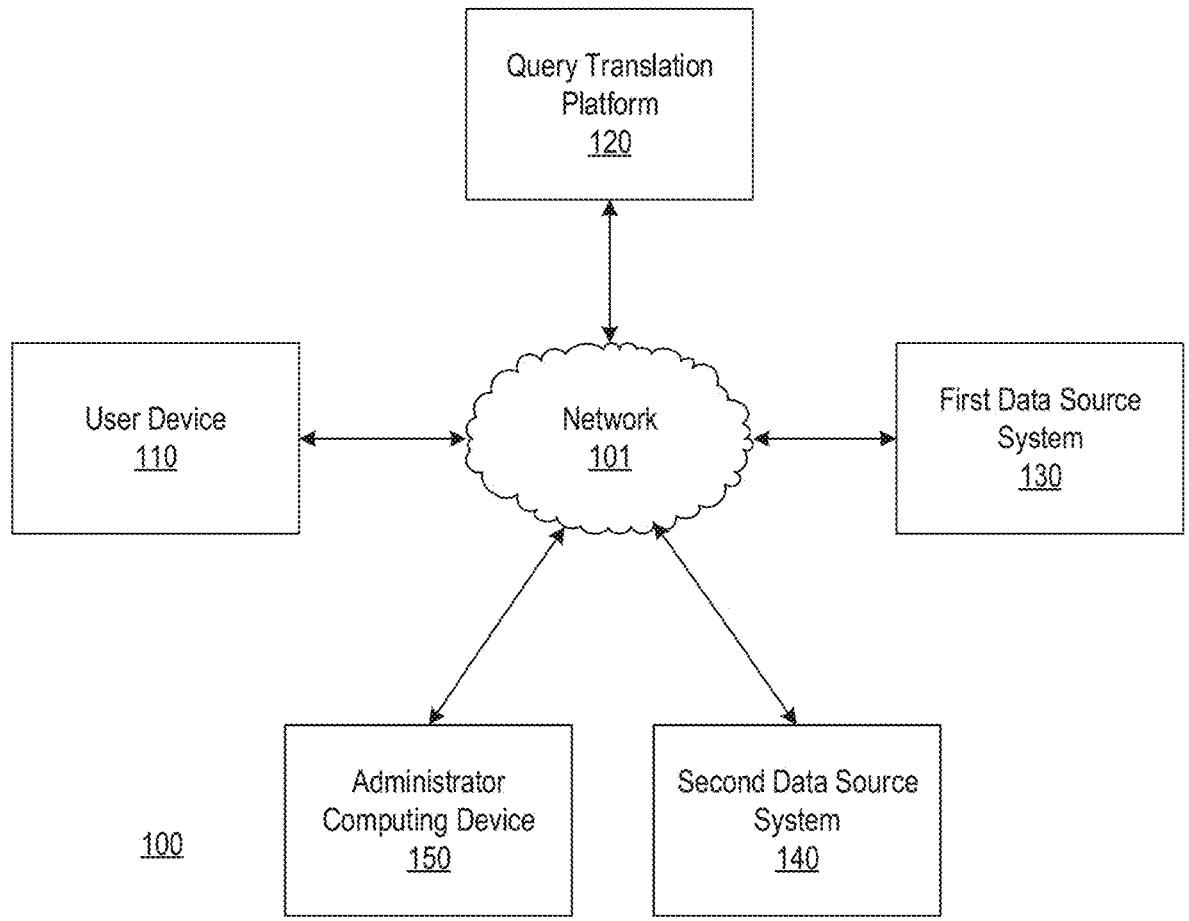
FIGS. 1A-1B depict an illustrative computing environment for enhanced compaction in transliteration of machine interpretable languages in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, queries (e.g., SQL queries, or the like) typically belong to a finite number of unique templates. As illustrated below, a given SQL input may be mapped to a specific translation included in a set of the pre-populated templates in a lookup table and then quickly reconstructed using its list of parameters. Additionally, as described further below, a transpiler may be used to automate translation of these SQL queries.

MILP has certain problems that may make it different from natural language processing (NLP) as explained in further below. For example, unlike NLP, MILP might not tolerate any error. A human may still understand the meaning despite significant errors present in the translation, whereas a machine may fail to execute a translation if there are any missing punctuations, an incorrect keyword is used, if a word is not properly capitalized, and/or if other errors are made. In addition, compared to NLP, MILP needs to be performed very fast. Most MILP jobs may need real time processing, and they might not allow time or conversational improvements as may be offered in the case of NLP.

Accordingly, one or more aspects of the disclosure provide a solution for this translation problem, which may be referred to as transliteration. In transliteration, rather than creating a translation from scratch, a pre-formatted template may be used to create a valid machine understandable code. The transliteration problem may deal with two steps. First, given a code written in a particular machine language to be translated, the transliteration method may identify and pull up correctly a particular pre-formatted template that may be used to create a complete machine understandable code. Then, once the template is identified, it may be enhanced/customized based on the input to create a complete machine understandable code.

It may be important to make the query conversion process faster, cheaper, and more efficient. Many input queries may be very similar to one another, and may be mapped to the same template of another format (e.g., a different SQL format) (e.g., as shown in Table 405 of FIG. 4A). Accordingly, we may be able to quickly map an incoming query to a previously translated query template and reconstruct a valid SQL.

In some instances, different types of compaction may be used to produce the query keys that may be used to map the input query to the output query templates. For example, in some instances, basic compaction may be used to replace non-essential query parameters with values. In some instances, string literals punctuated by a comma may also be compacted. In some instances, both string literals and any other parameters separated by a comma may be compacted. In some instances, both string literals and any other parameters separated by a comma and any and, or, or as statements may be compacted (e.g., as shown in Table 430 of FIG. 4F).

Figure 1B:
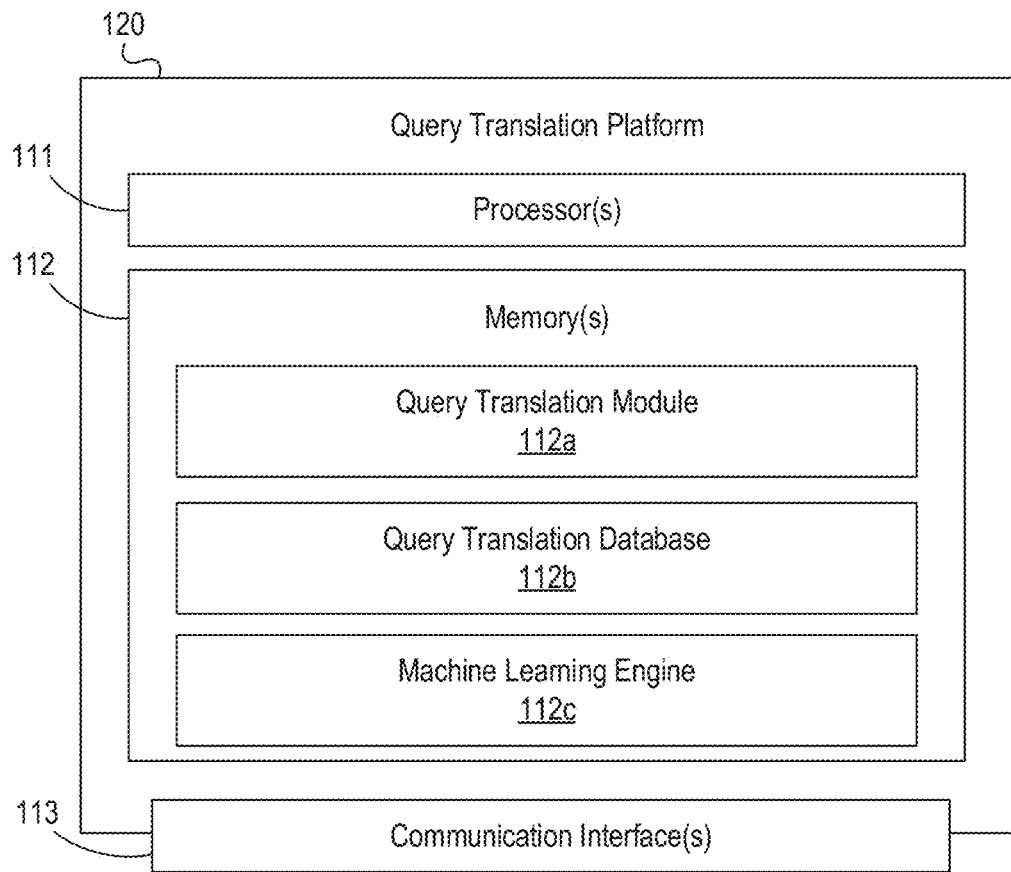

FIGS. 1A-1B depict an illustrative computing environment for enhanced compaction in transliteration of machine interpretable languages in accordance with one or more example embodiments. Referring to FIG. 1A, computing environment 100 may include one or more computer systems. For example, computing environment 100 may include user device 110, query translation platform 120, first data source system 130, second data source system 140, and administrator computing device 150.

User device 110 may be and/or otherwise include a laptop computer, desktop computer, mobile device, tablet, smartphone, and/or other device that may be used by an individual to access a client application (that may e.g., be configured to transmit data queries). In some instances, user device 110 may be configured to display one or more user interfaces (e.g., query response interfaces, or the like). Although a single user device 110 is shown, any number of user devices may be deployed in the systems/methods described below without departing from the scope of the disclosure.

As described further below, query translation platform 120 may be a computer system that includes one or more computing devices (e.g., servers, server blades, or the like) and/or other computer components (e.g., processors, memories, communication interfaces) that may be used to provide query translation, query responses, and/or database migration services as described further below. In these instances, the query translation platform 120 may be configured with a custom driver configured to intercept database queries (e.g., from client applications running on, for example, the user device 110) to provide the translation, response, and/or migration services.

First data source system 130 may be one or more computing devices (e.g., servers, server blades, and/or other devices). In some instances, the first data source system 130 may be configured to store data in a first format (e.g., a source format). In some instances, the first data source system 130 may be configured to store data to be migrated to a second format (e.g., a target format corresponding to the second data source system 140).

Second data source system 140 may be one or more computing devices (e.g., servers, server blades, and/or other devices). In some instances, the second data source system 140 may be configured to store data in the second format. In these instances, the second data source system 140 may be configured to store data that has been migrated from the first format (e.g., the source format of the first data source system 130).

Administrator computing device 150 may be and/or otherwise include a laptop computer, desktop computer, mobile device, tablet, smartphone, and/or other device that may be used by an individual to initiate or otherwise request a database migration (e.g., from the first data source system 130 to the second data source system 140). In some instances, the administrator computing device 150 may be operated by a system administrator, network administrator, and/or other employee of an enterprise organization corresponding to the query translation platform 120, the first data source system 130, and/or the second data source system 140.

Computing environment 100 also may include one or more networks, which may interconnect user device 110, query translation platform 120, first data source system 130, second data source system 140, and/or administrator computing device 150. For example, computing environment 100 may include a network 101 (which may interconnect, e.g., user device 110, query translation platform 120, first data source system 130, second data source system 140, and/or administrator computing device 150).

In one or more arrangements, user device 110, query translation platform 120, first data source system 130, second data source system 140, and/or administrator computing device 150 may be any type of computing device capable of sending and/or receiving requests and processing the requests accordingly. For example, user device 110, query translation platform 120, first data source system 130, second data source system 140, administrator computing device 150 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user device 110, query translation platform 120, first data source system 130, second data source system 140, and/or administrator computing device 150 may, in some instances, be special-purpose computing devices configured to perform specific functions.

Referring to FIG. 1B, query translation platform 120 may include one or more processors 111, memory 112, and communication interface 113. A data bus may interconnect processor 111, memory 112, and communication interface 113. Communication interface 113 may be a network interface configured to support communication between query translation platform 120 and one or more networks (e.g., network 101, or the like). Memory 112 may include one or more program modules having instructions that when executed by processor 111 cause query translation platform 120 to perform one or more functions described herein and/or one or more databases that may store and/or otherwise maintain information which may be used by such program modules and/or processor 111. In some instances, the one or more program modules and/or databases may be stored by and/or maintained in different memory units of query translation platform 120 and/or by different computing devices that may form and/or otherwise make up query translation platform 120. For example, memory 112 may have, host, store, and/or include query translation module 112a, query translation database 112b, and/or machine learning engine 112c.

Query translation module 112a may have instructions that direct and/or cause query translation platform 120 to provide improved database query translation and database migration, as discussed in greater detail below. Query translation database 112b may store information used by query translation module 112a and/or query translation platform 120 in application of advanced techniques to provide improved database query translation, database migration, and/or in performing other functions. Machine learning engine 112c may be used by the query translation module 112a and/or the query translation platform 120 to train, maintain, and/or otherwise refine translation model that may be used to provide enhanced database query translation and/or migration.

Figure 2A:
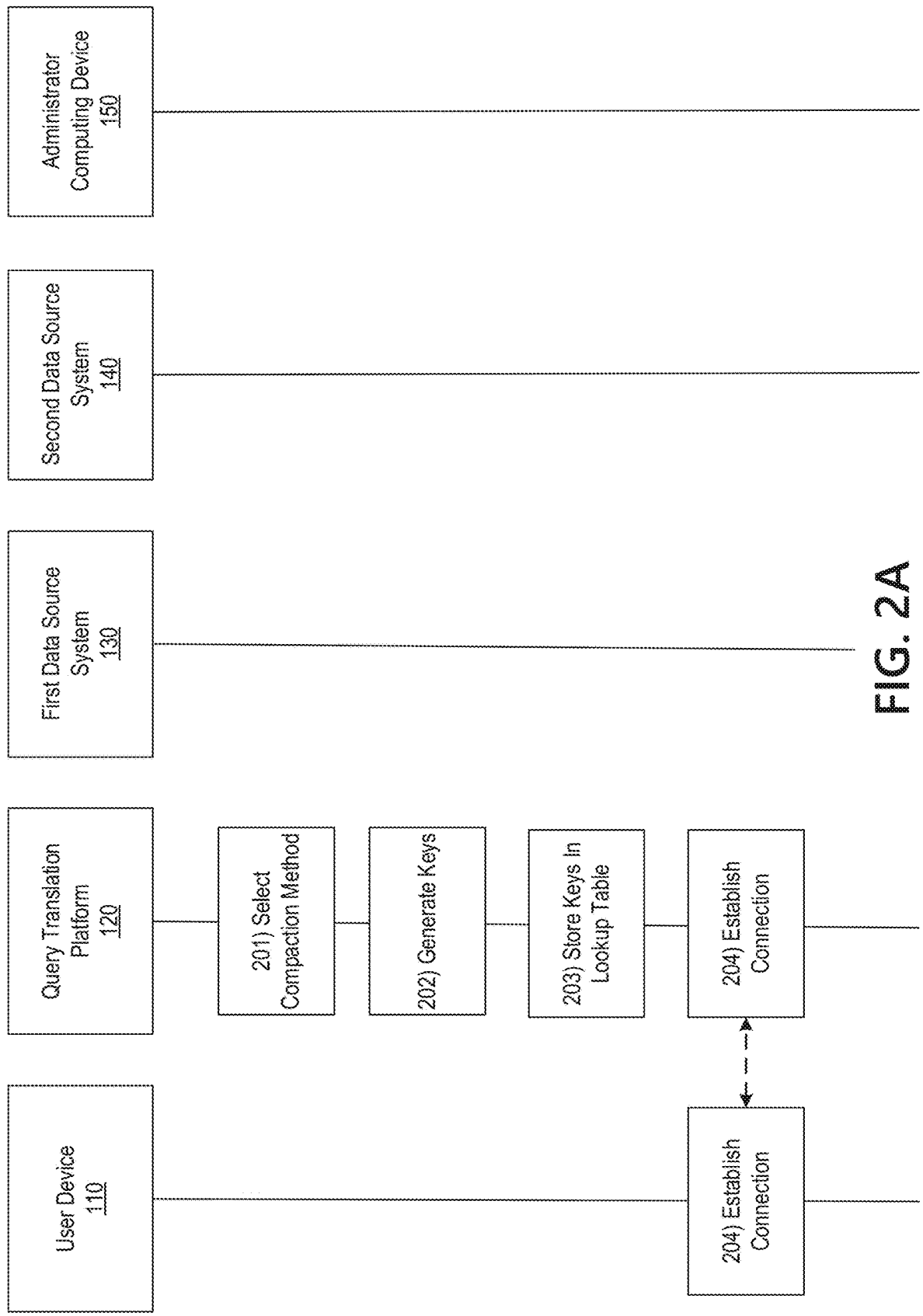
FIGS. 2A-2C depict an illustrative event sequence for enhanced compaction in transliteration of machine interpretable languages in accordance with one or more example embodiments.
Figure 2B:
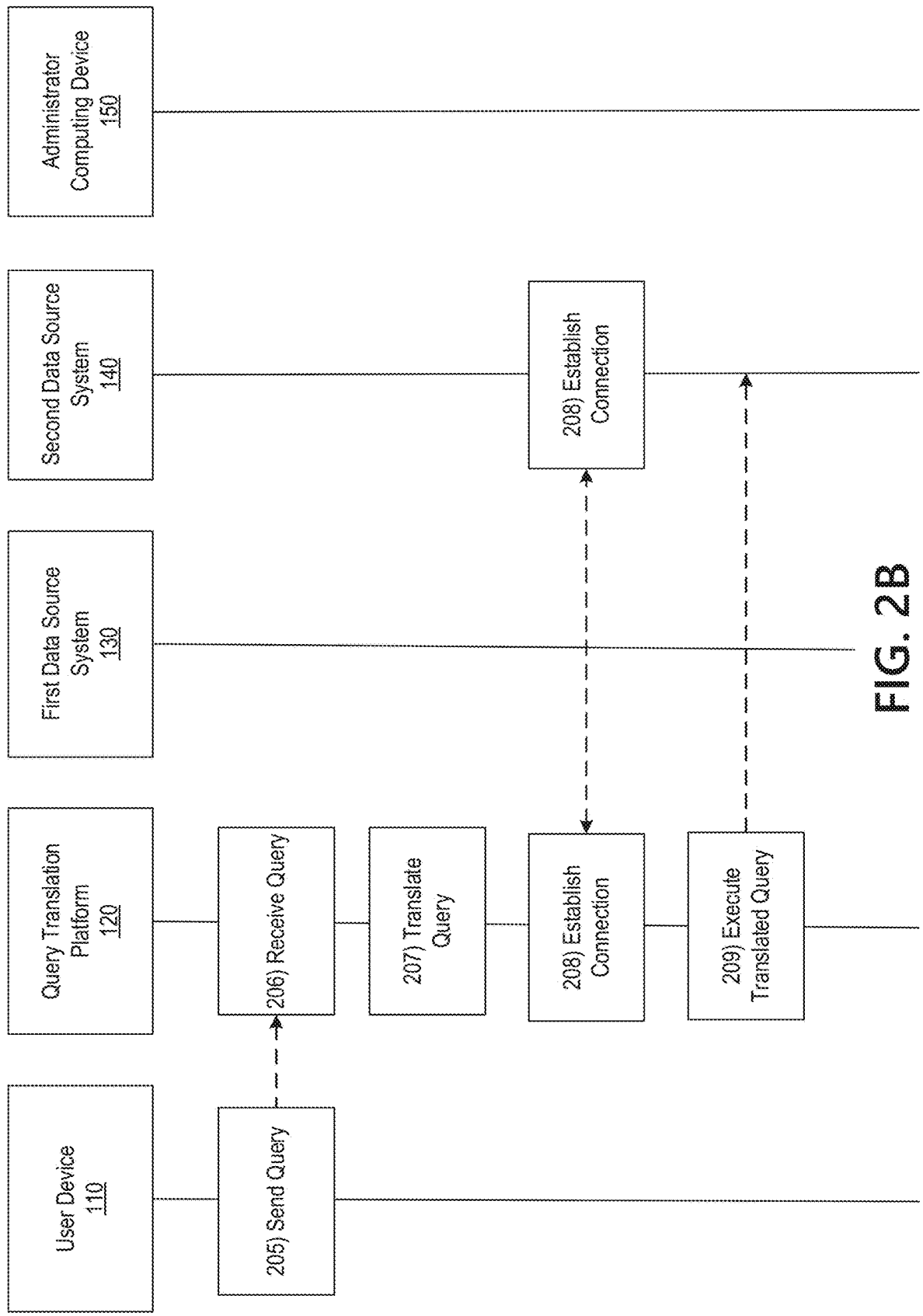
Figure 2C:
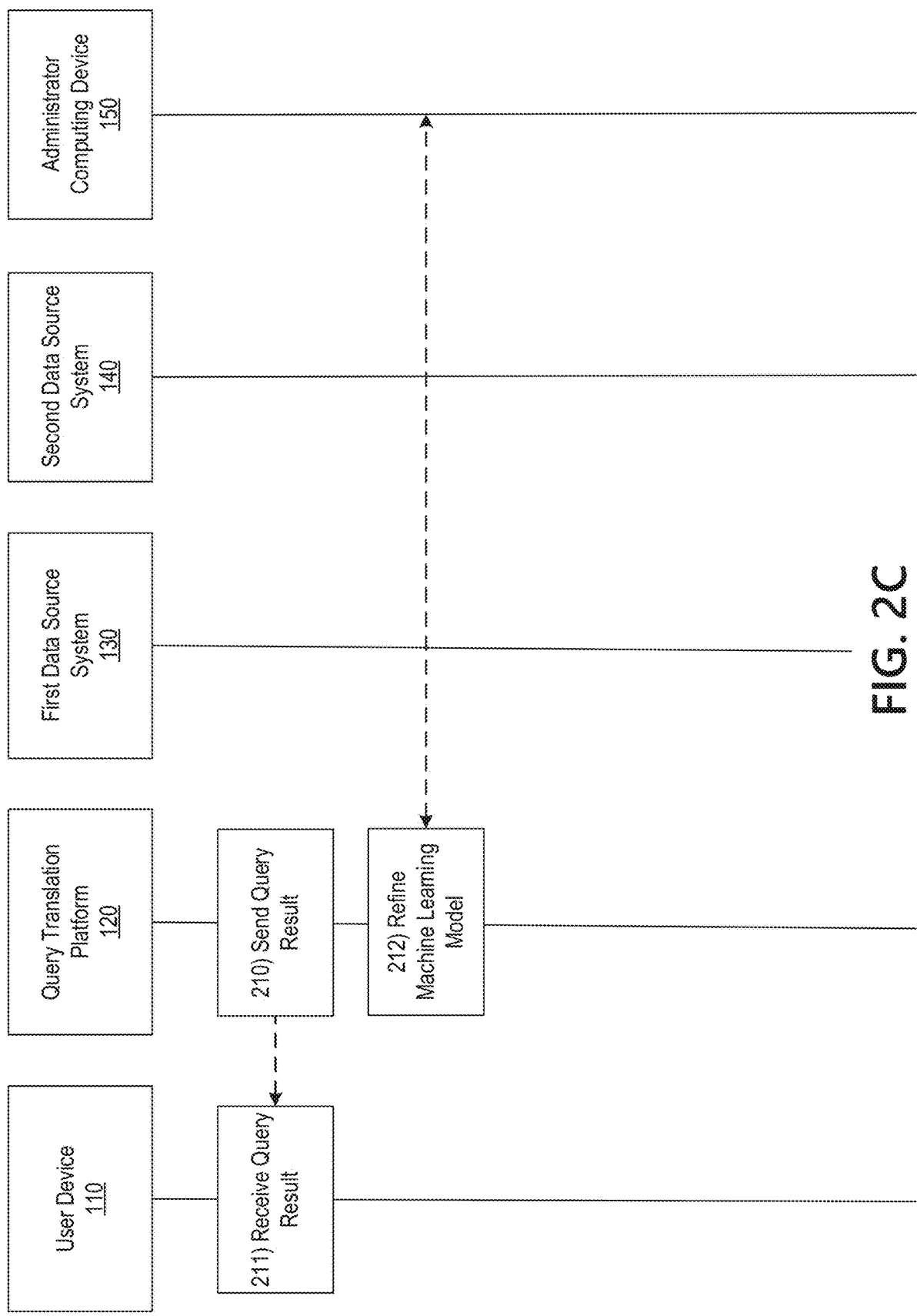

FIGS. 2A-2C depict an illustrative event sequence for performing enhanced compaction in the transliteration of machine interpretable languages in accordance with one or more example embodiments. Referring to FIG. 2A, the query translation platform 120 may select a compaction method. For example, in order to translate queries from a first format (e.g., configured for execution on a first database such as the first data source system 130) into a second format (e.g., configured for execution on a second database such as the second data source system 140), the query translation platform 120 may compile a lookup table that includes correlations between input queries and output queries using query keys. In some instances, these query keys may be created by applying a compaction method to the input queries, which may include removing non-essential parameters from the input queries, and replacing them with other values/variables/pointers according to the compaction. Examples of these input queries, keys, and parameters are shown in table 415 of FIG. 4C.

In order to perform such compaction to produce the query keys, a method of compaction may first be identified. For example, different methods of compaction may be used to balance processing power, accuracy, runtime, and/or other information. In some instances, the query translation platform 120 may train (and subsequently use) a machine learning model to select the most appropriate method of compaction. For example, the query translation platform 120 may train the machine learning model to select a method of compaction based on characteristics of input queries.

Specifically, the query translation platform 120 may train the machine learning model to parse a set of input queries, and identify whether or not a number of queries including an "and," "or," "as," and/or other statement exceeds a predetermined threshold. If the number does exceed the predetermined threshold, the query translation platform 120 may be trained to select and/or select (e.g., once trained) a first compaction method, configured to output a common query key for queries including such statements, string literals, parameters separated by commas, and/or simple non-essential parameters (e.g., as shown in table 430 of FIG. 4F with regard to "Flavor 4"). If the number does not meet or exceed the predetermined threshold, the query translation platform 120 may identify whether a number of queries including parameters separated by commas (other than string literals) exceeds the threshold. If the number does exceed the predetermined threshold, the query translation platform 120 may be trained to select and/or select (e.g., once trained) a second compaction method, configured to output a common query key for queries including string literals, parameters separated by commas, and/or simple non-essential parameters. For example, the second compaction method may include compacting queries only by removing non-essential parameters and replacing any group of parameters separated by a comma, including string literals, with a single variable (e.g., as shown in table 430 of FIG. 4F with regard to "Flavor 3). If the number does not meet or exceed the predetermined threshold, the query translation platform 120 may identify whether or not a number of queries including string literals exceeds the threshold. If the number does exceed the predetermined threshold, the query translation platform 120 may be trained to select and/or select (e.g., once trained) a third compaction method, configured to output a common query key for queries including string literals and/or simple non-essential parameters. For example, the third compaction method may include compacting queries only by removing non-essential parameters and replacing each string literal punctuated by a comma, including multiple parameters, with a single variable (e.g., as shown in table 430 of FIG. 4F with regard to "Flavor 2"). If the number does not meet or exceed the predetermined threshold, the query translation platform 120 may be trained to perform (e.g., and/or otherwise perform) a fourth compaction method, configured to replace any non-essential parameters with variables. For example, the fourth compaction method may include compacting queries only by removing non-essential parameters from the queries and replacing them with variables (e.g., as shown in table 430 of FIG. 4F with regard to "Flavor 1"). The machine learning model may be trained, for example, using historical queries, which may, in some instances, be labelled based on their characteristics (e.g., string literals, commas, statements, and/or otherwise).

In some instances, such selection of a compaction method based on the content of a given query set may offer a runtime advantage by applying techniques to reduce a number of different query keys that are produced using a method that covers only elements that are included within the input queries. For example, performing compaction using the first method described above may have longer lag or runtime than the fourth method, as it is executing a more complex compaction technique. Accordingly, if there are no input queries that include "as" statements, string literals, or parameters separated by commas, it may be advantageous to simply use the fourth method to perform the compaction.

These different types of compaction may be illustrated, for example, in Table 430 of FIG. 4F. For example, as shown in FIG. 4F, using "Flavor 4," may produce the same query key for each example input query, whereas "Flavor 3," "Flavor 2," and "Flavor 1" may produce the same query key for three, two, and one input query respectively. Although these four different methods of compaction are described, compaction based on other query characteristics may be performed without departing from the scope of the disclosure.

At step 202, once a method of compaction has been selected at step 201, the query translation platform 120 may apply the selected method of compaction to a set of input queries to create the above described lookup table, which may, in some instances, be similar to table 420 in FIG. 4D. For example, the query translation platform 120 may remove non-essential parameters from the input queries and compact them (using the selected method of compaction) so as to replace one or more of the non-essential parameters with variables/values. These query keys may also be stored with a formatted output query, corresponding to the query key and formatted in the second format. Examples of this compaction are shown in table 430 of FIG. 4F, where various keys are created from example queries using the different compaction methods.

At step 203, once the query keys have been created, they may be stored in the lookup table along with corresponding formatted output queries. In doing so, a relationship between input queries and formatted output queries may be established (e.g., by linking each to a given query key).

At step 204, the user device 110 may establish a connection with the translation platform 120. For example, the user device 110 may establish a first wireless data connection with the translation platform 120 to link the user device 110 with the query translation platform 120 (e.g., in preparation for sending queries for translation). In some instances, the user device 110 may identify whether a connection is already established with the query translation platform 120. If a connection is already established with the query translation platform 120, the user device 110 might not re-establish the connection. If a connection is not yet established with the query translation platform 120, the user device 110 may establish the first wireless data connection as described herein.

Referring to FIG. 2B, at step 205, the user device 110 (e.g., a client application at the user device 110) may send an input database query to the query translation platform 120 (e.g., while the first wireless data connection is established), which may be formatted in the first format for execution on the first data source system 930.

At step 206, the query translation platform 120 may receive the input database query from the client application. For example, the query translation platform 120 may receive an input database query formatted in a first format (e.g., a source format) corresponding to a first database (e.g., the first data source system 130). In these instances, the query translation platform 120 may utilize the custom driver to intercept the input database query prior to routing the input database query for execution on a database. For example, in receiving the input database query, the query translation platform 120 may receive a query formatted in a machine interpretable language such as C, C++, Python, SQL, and/or other machine interpretable languages. In these examples, the query translation platform 120 may receive a query that includes essential parameters (e.g., keywords, symbols, and/or other parameters) and non-essential parameters (specific columns, rows, data ranges, letter case, spaces, tabs, new lines, and/or other parameters).

At step 207, the query translation platform 120 may translate the input database query from the first format of the first data source system 130 to a second format of the second data source system 140. For example, the query translation platform 120 may translate the input database query using an efficient transliteration process, a recursive transliteration process, and/or a transpilation process. In some instances, the query translation platform 120 may perform such translation as a result of a database migration (e.g., migrating data stored in the source format at the first data source system 130 to the second data source system 140 in the target format). Rather than causing the user device 110 or the client application to be reprogrammed to generate queries in the target format, the query translation platform 120 may be configured to translate database queries (such as the input database query) from the source format to the target format for seamless execution on the second data source system 120/target format. For example, many client applications may rely on data stored at the first data source system 130, and thus the query translation platform 120 may translate the data without re-engineering all of these client applications (which may, for example, consume significant time and computer processing resources, and/or introduce many possibilities for error and inefficiency).

In some instances, the query translation platform 120 may perform the translation in response to or based on occurrence of a data migration. For example, an enterprise organization may migrate data from a first format (stored at a first location/warehouse) to a second format (stored at a second location/warehouse). As a result, client applications configured to produce queries in the first format may otherwise be unable to execute queries against the second warehouse without otherwise rewriting the queries.

In some instances, to perform the translation, the query translation platform 120 may trap the database queries at the point of execution rather than causing client applications to rewrite the queries. For example, the query translation platform 120 may cause client applications to point to a custom driver (or driver wrapper) configured for query translation rather than a previous driver.

In some instances, the query translation platform 120 may use a query translation library to perform the translation. For example, the query translation platform 120 may identify that most source database queries fit into a few standard formats or patterns, and may use these standard formats/patterns to identify corresponding output/translated queries in the target format. By implementing the query translation library (which may, e.g., include the lookup table stored at step 203), the query translation platform 120 may perform a lookup function based on a format of a database query to quickly identify a translated query.

For example, the query translation platform 120 may extract non-essential portions of the database query. For example, the query translation platform 920 may extract cases and/or instances of keywords, spaces, tabs, newlines, and/or other non-essential parameters, and might not extract ordering, word locations, formatting, and/or other essential parameters. For example, as illustrated in table 415 of FIG. 4C, the database query may be "select * FROM students WHERE class_id=XYZ" and the query translation platform 120 may remove "students," "class_id," and "XYZ," from the database query to leave only the essential portions (which may, e.g., make up and/or otherwise form the query structure: "select * FROM_____WHERE _____=_____").

The query translation platform 120 may replace the extracted non-essential portions of the database query with pointers. For example, referring back to FIG. 4C and the example described above, the query translation platform 120 may replace "students" with a first pointer "$0," "class_id" with a second pointer "$1," and "XYZ" with a third pointer "$2." In doing so, the query translation platform 120 may generate a source query key corresponding to the database query. For example, the source query key for the query may be "select*FROM$0WHERE$1=$2," as illustrated in FIG. 4C. In some instances, in doing the replacement of the non-essential parameters with the pointers, the query translation platform 120 may be performing compaction as described above at step 202. In some instances, the query translation platform 120 may select a method of compaction in a similar method to that described above with regard to step 201.

In addition to performing the compaction to generate the source query key, the query translation platform 120 may store the non-essential portions of the database query as query parameters. For example, the query translation platform 120 may store the query parameters along with the source query key (e.g., as a label for the source query key). In the example above, the query translation platform 120 thus may store "students," "class_id," and "XYZ" as query parameters.

The query translation platform 120 may perform a lookup function on the query translation library (e.g., including the lookup table created at step 203) using the source query key. Once the query translation platform 120 identifies a match between the source query key and one of the stored query keys, the query translation platform 120 may identify a corresponding formatted query statement (e.g., formatted in the second/target format). By identifying that the formatted query statement corresponds to the source query key, the query translation platform 120 may verify that the formatted query statement corresponds to the database input query. In these instances, the formatted query statement may include pointers corresponding to the pointers in the source query key. In some instances, the query translation platform 120 may identify that the source query key does not exactly match any translated queries in the query translation table, but may identify a corresponding translated query using fuzzy matching and/or other matching techniques.

The query translation platform 120 may input the query parameters into the translated query. For example, the query translation platform 120 may replace the pointers in the translated query with the query parameters associated with each corresponding pointer from the source query key. For example, the query translation platform 120 may replace "$0" with "students," "$1" with "class_id," and "$2" with "XYZ." In doing so, the query translation platform 120 may produce an output query in the target dialect that corresponds to the database query in the source dialect (which may, e.g., result in a query configured for execution on the second data source system 140).

Such a method may have two primary technical advantages over other translation methods. First, the speed of translation may be increased. For example, by executing a lookup function to identify a matching query key, the query translation platform 120 may avoid inefficiencies and/or other processing delays caused by the use of other language processing techniques in translation. Second, the translated queries stored in the query translation library may be pre-verified, and thus accuracy of the output/translated queries may be ensured. In some instances, if the query translation platform 120 is not successful in identifying an output database query using the lookup function, a real time translation may be performed.

In some instances, in translating the database queries, the query translation platform 120 may translate the database queries to a different machine interpretable language (e.g., C, C++, Python, SQL, and/or other machine interpretable languages). In some instances, because the translated queries are formatted in a machine interpretable language, they might not be configured to tolerate error (e.g., in formatting, language, spelling, or otherwise). In some instances, such translation may be performed by the query translation platform 120 in real time.

Figures 4A, 4B:
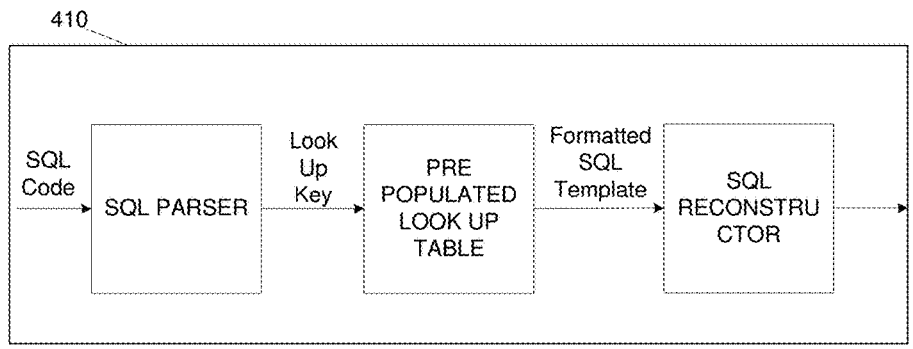

This translation may be further illustrated, for example, in diagram 410 of FIG. 4B. For example, the input SQL code may be fed into a parser, which may be used to perform the compaction and identify a corresponding query key. The key may then be used to perform a lookup function on the pre-populated lookup table to identify a formatted SQL template. The parameters of the input SQL code may then be fed into the reconstructor along with the formatted SQL template to produce a translated output query. This reconstruction is shown, for example, in tables 420 of FIG. 4D, and 425 of FIG. 4E. For example, a key may be matched to a formatted statement as shown in table 420, and the parameters for the corresponding key (as shown in table 425) may be input into the formatted statement to produce a reconstructed SQL statement.

In some instances, the query translation platform 120 may identify that the database query is already formatted for execution on the second data source system 140. In these instances, the query translation platform 120 may execute the database query on the second data source system 140 (e.g., proceed to step 209) without performing the above described translation.

At step 208, the query translation platform 120 may establish a connection with the second data source system 140. For example, the query translation platform 120 may establish a second wireless data connection with the second data source system 140 to link the query translation platform 120 to the second data source system 140 (e.g., in preparation for executing queries). In some instances, the query translation platform 120 may identify whether a connection is already established with the second data source system 140. If a connection is already established, the query translation platform 120 might not re-establish the connection. If a connection is not yet established, the query translation platform 120 may establish the second wireless data connection as described herein. At step 209, the query translation platform 120 may execute the translated database query on the second data source system 140 to produce a query result.

Referring to FIG. 2C, at step 210, the query translation platform 120 may send (e.g., while the first wireless data connection is established) the query result to the user device 110 (e.g., to the client application). At step 211, the user device 110 may receive the query result sent at step 210.

At step 212, the query translation platform 120 may refine a machine learning model used to produce the translated queries (which may, in some instances, involve communication with the administrator computing device 150 and/or the user device 110). For example, feedback may be received from users via the user device 110 and/or administrator computing device 150 regarding accuracy of translated queries. The query translation platform 120 may feed this information back into the machine learning model used to select a compaction method, which may, e.g., establish a continuous and dynamic feedback loop to constantly improve the compaction method selection, and thus to improve accuracy the overall query translation process.

Figure 3:
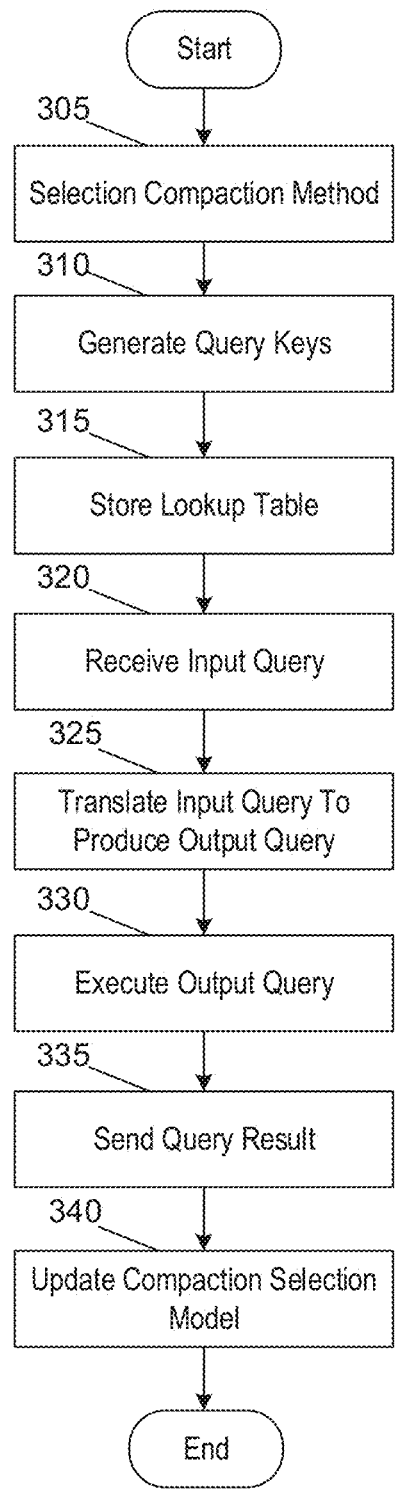
FIG. 3 depicts an illustrative method for enhanced compaction in transliteration of machine interpretable languages in accordance with one or more example embodiments.

FIG. 3 depicts an illustrative method for performing enhanced compaction in the transliteration of machine interpretable languages in accordance with one or more example embodiments. At step 305, the computing platform may select a compaction method. At step 310, the computing platform may generate query keys using the selected compaction method. At step 315, the computing platform may store a lookup table that includes the query keys. At step 320, the computing platform may receive an input query. At step 325, the computing platform may translate the input query to produce an output (e.g., translated) query. At step 330, the computing platform may execute the output query against a data source to produce a query result. At step 335, the computing platform may send the query result to a user device. At step 340, the computing platform may update a model used to perform the compaction method selection.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate a plurality of query keys, configured for use in translating queries from a first format to a second format, wherein generating the plurality of query keys comprises, for each input query corresponding to the plurality of query keys:
   selecting, based on features of the input query, a compaction method of a plurality of compaction methods, wherein use of each available compaction method produces a common query key for a different number of input queries, wherein selecting the compaction method comprises:
   identifying whether or not any of the queries include an as statement,
   based on identifying that at least one query includes an as statement:
   selecting a first compaction method, wherein selecting the first compaction method causes the same query key to be produced for queries that include one or more of:
   individual parameters, string literals punctuated by commas, other parameters separated by commas, and an as statement, and applying the first compaction method to the input query to produce a corresponding query key, wherein application of the first compaction method to the input query consumes less processing power and yields higher accuracy as compared to application of a different compaction method based on characteristics of the at least one query, and
   based on identifying that the queries do not include the as statement:
   selecting the different compaction method, and applying the different compaction method to the input query to produce the corresponding query key, wherein application of the different compaction method to the input query consumes less processing power and yields higher accuracy as compared to application of the first compaction method based on the characteristics of the at least one query;
   store the plurality of query keys in a lookup table;
   receive a first query, corresponding to the input queries, formatted in the first format;
   translate, by identifying a query key of the plurality of query keys corresponding to the first query in the lookup table, the first query to produce a second query, wherein the second query is formatted in the second format; and
   execute the second query.

2. The computing platform of claim 1, wherein the compaction method comprises compacting the first query only by:
   removing non-essential parameters from the first query; and
   replacing each essential parameter with a variable.

3. The computing platform of claim 2, wherein the compaction method produces a different query key for input queries that include one or more of: a string literal, parameters separated by a comma, and an as statement.

4. The computing platform of claim 1, wherein the compaction method comprises compacting the first query only by:
   removing non-essential parameters from the first query; and
   replacing each essential parameter with a variable, wherein replacing each essential parameter with a variable comprises replacing a string literal punctuated by a comma, including multiple parameters, with a single variable.

5. The computing platform of claim 4, wherein the compaction method produces:
   the same query key for input queries that include one or more of: individual parameters and string literals punctuated by commas; and
   different query keys for input queries that include one or more of: other parameters separated by commas, and an as statement.

6. The computing platform of claim 1, wherein the compaction method comprises compacting the first query only by:
   removing non-essential parameters from the first query; and
   replacing each essential parameter with a variable, wherein replacing each essential parameter with a variable comprises replacing any group of parameters separated by a comma, including string literals, with a single variable.

7. The computing platform of claim 6, wherein the compaction method produces:
   the same query key for input queries that include one or more of: individual parameters, string literals punctuated by commas, and other parameters separated by commas; and
   different query keys for input queries that include an as statement.

8. The computing platform of claim 1, wherein the compaction method comprises compacting the first query by:
   removing non-essential parameters from the first query; and
   replacing each essential parameter with a variable, wherein replacing each essential parameter with a variable comprises replacing any group of parameters separated by a comma, including string literals, and any group of parameters separated by an as statement, with a single variable.

9. The computing platform of claim 8, wherein the compaction method produces the same query key for input queries that include one or more of: individual parameters, string literals punctuated by commas, other parameters separated by commas, and an as statement.

10. The computing platform of claim 1, wherein selecting the different compaction method comprises:
    identifying whether or not any of the queries include parameters separated by commas other than string literals;
    based on identifying that at least one query does include the parameters separated by commas other than string literals, applying a second compaction method, wherein applying the second compaction method causes the same query key to be produced for queries that include: individual parameters, string literals punctuated by commas, and other parameters separated by commas;

based on identifying that the queries do not include the parameters separated by commas other than string literals, identifying whether or not any of the queries include string literals;

based on identifying that at least one query does include the string literals, applying a third compaction method, wherein applying the third compaction method causes the same query key to be produced for queries that include: individual parameters and string literals; and based on identifying that the queries do not include string literals, applying a fourth compaction method, wherein applying the fourth compaction method comprises replacing each non-essential parameter in the queries with a unique variable.

11. The computing platform of claim 1, wherein the lookup table includes the queries, the query keys corresponding to the queries, and formatted statements corresponding to the query keys, wherein the formatted statements are in the second format.

12. The computing platform of claim 11, wherein translating the first query to the second query comprises:
removing non-essential parameters from the first query;
identifying the query key corresponding to the first query;
identifying a formatted statement corresponding to the query key; and
replacing variables in the formatted statement with the non-essential parameters.

13. The computing platform of claim 1, wherein selecting the compaction method further comprises using a machine learning model, and wherein the machine learning model is trained to parse the queries and to compare, to a predetermined threshold, a number of: the individual parameters, the string literals punctuated by commas, the other parameters separated by commas, or as statements.

14. The computing platform of claim 13, wherein the memory stores additional computer-readable instructions that, when executed by the at least one processor, cause the computing platform to:
receive feedback on the second query; and
refine, based on the feedback and using a dynamic feedback loop, the machine learning model to continuously improve compaction method selection.

15. A method comprising:
at a computing platform comprising at least one processor, a communication interface, and memory:
generating a plurality of query keys, configured for use in translating queries from a first format to a second format, wherein generating the plurality of query keys comprises, for each input query corresponding to the plurality of query keys:
selecting, based on features of the input query, a compaction method of a plurality of compaction methods, wherein use of each available compaction method produces a common query key for a different number of input queries, wherein selecting the compaction method comprises:
identifying whether or not any of the queries include an as statement,
based on identifying that at least one query includes an as statement:
selecting a first compaction method, wherein selecting the first compaction method causes the same query key to be produced for queries that include one or more of:
individual parameters, string literals punctuated by commas, other parameters separated by commas, and an as statement, and applying the first compaction method to the input query to produce a corresponding query key, wherein application of the first compaction method to the input query consumes less processing power and yields higher accuracy as compared to application of a different compaction method based on characteristics of the at least one query, and
based on identifying that the queries do not include the as statement:
selecting a different compaction method, and applying the different compaction method to the input query to produce the corresponding query key, wherein application of the different compaction method to the input query consumes less processing power and yields higher accuracy as compared to application of the first compaction method based on the characteristics of the at least one query;
storing the plurality of query keys in a lookup table;
receiving a first query, corresponding to the input queries, formatted in the first format;
translating, by identifying a query key of the plurality of query keys corresponding to the first query in the lookup table, the first query to produce a second query, wherein the second query is formatted in the second format; and
executing the second query.

16. The method of claim 15, wherein the compaction method comprises compacting the first query only by:
removing non-essential parameters from the first query; and
replacing each essential parameter with a variable, wherein replacing each essential parameter with a variable comprises replacing a string literal punctuated by a comma, including multiple parameters, with a single variable.

17. The method of claim 16, wherein the compaction method produces:
the same query key for input queries that include one or more of: individual parameters and string literals punctuated by commas; and
different query keys for input queries that include one or more of: other parameters separated by commas, and an as statement.

18. The method of claim 15, wherein the compaction method comprises compacting the first query only by:
removing non-essential parameters from the first query; and
replacing each essential parameter with a variable.

19. The method of claim 18, wherein the compaction method produces a different query key for input queries that include one or more of: a string literal, parameters separated by a comma, and an as statement.

20. One or more non-transitory computer-readable media storing instructions that, when executed by a computing platform comprising at least one processor, a communication interface, and memory, cause the computing platform to:
generate a plurality of query keys, configured for use in translating queries from a first format to a second format, wherein generating the plurality of query keys comprises, for each input query corresponding to the plurality of query keys:

selecting, based on features of the input query, a compaction method of a plurality of compaction methods, wherein use of each available compaction method produces a common query key for a different number of input queries, wherein selecting the compaction method comprises:
- identifying whether or not any of the queries include an as statement,
- based on identifying that at least one query includes an as statement:
  - selecting a first compaction method, wherein selecting the first compaction method causes the same query key to be produced for queries that include one or more of: individual parameters, string literals punctuated by commas, other parameters separated by commas, and an as statement, and
  - applying the first compaction method to the input query to produce a corresponding query key, wherein application of the first compaction method to the input query consumes less processing power and yields higher accuracy as compared to application of a different compaction method based on characteristics of the at least one query, and
- based on identifying that the queries do not include the as statement:
  - selecting the different compaction method, and
  - applying the different compaction method to the input query to produce the corresponding query key, wherein application of the different compaction method to the input query consumes less processing power and yields higher accuracy as compared to application of the first compaction method based on the characteristics of the at least one query;

store the plurality of query keys in a lookup table;

receive a first query, corresponding to the input queries, formatted in the first format;

translate, by identifying a query key of the plurality of query keys corresponding to the first query in the lookup table, the first query to produce a second query, wherein the second query is formatted in the second format; and execute the second query.

* * * * *